3,226,716
DELAY LINE SYNCHRONIZER
Bernarr H. Humpherys, Escondido, Calif., assignor to the United States of America as represented by the Secretary of the Navy
Filed Sept. 16, 1963, Ser. No. 309,355
5 Claims. (Cl. 343—6.5)
(Granted under Title 35, U.S. Code (1952), sec. 266)

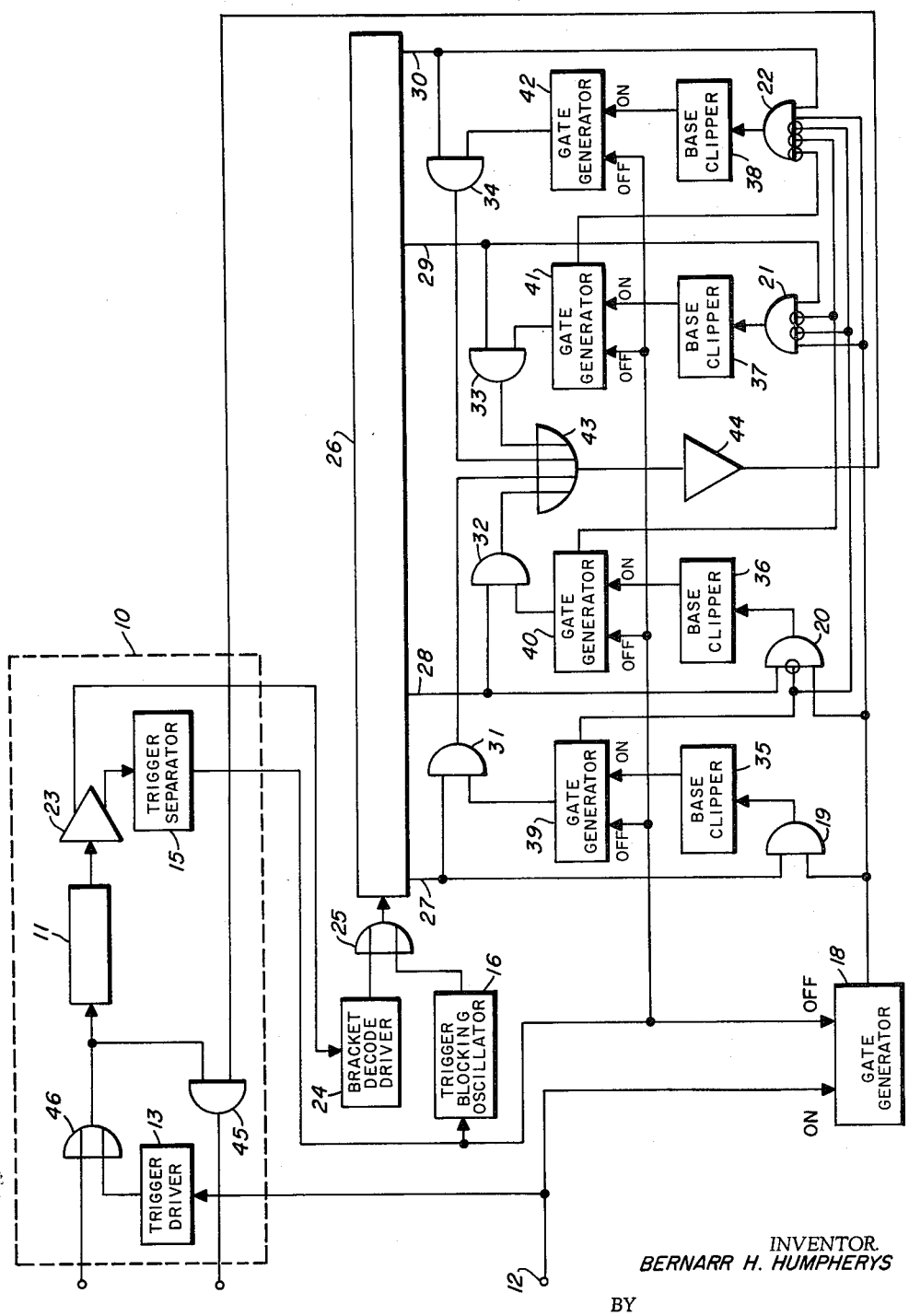

The invention described herein may be manufactured and used by or for the Government of the United States of America for governmental purposes without the payment of any royalties thereon or therefor.

The present invention relates to a synchronizer and more particularly, to a synchronizing means adapted for use with an IFF defruiter and specifically, to a synchronizing means adapted for use with an IFF defruiter so that the delay interval of the IFF defruiter corresponds to the time interval between successive radar system trigger pulses.

The present invention is intended for use with the IFF defruiter described in co-pending application Serial No. 181,209 filed March 20, 1962. The co-pending application describes an IFF defruiter which is intended for use with a radar system. In the radar system of S.N. 181,209 the main pulses are provided by the IFF defruiter i.e. the radar system is slaved to the defruiter. In normal circumstances, however, it is desirable that the main radar provide its own system trigger rather than being slaved to an associated equipment such as the IFF defruiter. In addition, it is desirable that an IFF defruiter be provided which is compatible with presently existing radar systems, many of which utilize time jitter in their transmitting technique.

An object of the present invention is to provide a practical synchronizing means.

An additional object of the present invention is to provide a delay line synchronizer for use with an IFF system defruiter.

A further object of the present invention is to provide a synchronizing means which makes IFF defruiters compatible with presently existing radar systems.

An additional object of the present invention is to provide a delay line synchronizer which is capable of measuring the difference interval between the time a signal is stored in a storage device and the interval of time between trigger pulses and adjusting the length of the storage device to correspond to the time interval between trigger pulses.

Other objects and many of the attendant advantages of this invention will be readily appreciated as the same becomes better understood by reference to the following detailed description when considered in connection with the accompanying drawings wherein:

The figure illustrates a preferred embodiment of the present invention in block diagram form.

In the figure the components within dotted lines 10 represent the IFF defruiter of co-pending application Serial No. 181,209 filed March 20, 1962. In that system bracket-decoded video returns are received as one input to an OR gate 46, the output of which is connected to the input of a delay line 11. The delay line 11 in the present embodiment is always chosen to effect a time delay that is shorter than the smallest expected time interval between trigger pulses of an associated radar system. The terminology "smallest expected time interval" is used in order to encompass a radar system which utilizes time jitter and therefore varies the time interval between main trigger pulses.

The output of the delay line 11 is amplified in an amplifier 23 the output of which is coupled to a bracket decode driver 24 which functions in a manner similar to an ordinary buffer circuit. Another output from amplifier 23 is coupled to a trigger separator 15 which is essentially a base clipper which blocks low level video and allow the relatively higher level trigger pulse to pass through.

Trigger pulses from the main radar system are received at terminal 12 and passed on to the input to trigger driver 13 and to the "ON" input of gate generator 18. The output of driver 13 is supplied to the other input of OR gate 46. The "OFF" input of gate generator 18 is connected to the output of trigger separator 15. The output of gate generator 18 is supplied to one of the inputs of AND gates 19 through 22 respectively.

It may be noted that generator 18 functions in such a manner that when it is ON, an output is produced.

The output of the trigger separator 15 is also coupled to a trigger blocking oscillator 16 to raise the amplitude of the trigger pulse. The output of blocking oscillator 16 is then coupled as one input to an OR gate 25. Another input to OR gate 25 comprises the ouput of the bracket decode driver 24.

The output of the OR gate 25 is coupled as an input to a tapped delay line 26 which, in the present embodiment and by way of example, is chosen to be 0.8µ sec. long. It is to be understood, however, that the delay line 26 could be of any practical length depending upon the number of increments of delay and, in addition, that the delay elements of 0.2µ sec., the next having increments of 0.4µ sec., the next 0.6µ sec., etc., etc. It is to be understood that one may use any desired increment and multiples of the original increment. The particular increments and multiples thereof chosen, would, of course, be dependent on the expected variation in trigger pulse spacing of the associated radar system. With a length of 0.8µ sec. as mentioned as an example, it follows that the maximum compensable variation in trigger pulse spacing would be 0.8µ sec.

However, in the present instance, output taps corresponding to 0.2µ sec. intervals are coupled off at 27 to 30 respectively. Output tap 27 is coupled as one input to an AND gate 31 and also coupled as another input to AND gate 19; output tap 28 is coupled as one input to AND gate 32 and also as another input to AND gate 20; output tap 29 is coupled as one input to an AND gate 33 and another input to AND gate 21 while output tap 30 is connected as an input to AND gate 34 and as another input to AND gate 22.

The outputs from AND gates 19 through 22 are in turn, coupled as inputs to base clippers 35 through 38 respectively. The output of base clippers 35 through 38 are coupled as the "ON" input to gate generators 39 through 42 respectively. The "OFF" input to the respective gate generators is provided from the output of trigger separator 15. The outputs from gate generators 39 through 42 are coupled as another input to AND gates 31 through 34 respectively. In addition, gate generator 39 has an output which is coupled as an inhibit pulse to AND gates 20 through 22; gate generator 40 has an output which is coupled as an inhibit pulse to AND gates 21 and 22 and gate generator 41 has an output which is coupled as an inhibit pulse to AND gate 22.

The outputs from AND gates 31 through 34 are coupled as inputs to an OR gate 43 the output of which is amplified in an amplifier 44 and coupled as one input to an AND gate 45. AND gate 45 receives another input from the output of OR gate 46 and the output of the AND gate 45, when present, corresponds to a defruited output which is utilized in the IFF system as set forth in the aforementioned co-pending application.

OPERATION

In operation, at a time $t_0$ the radar trigger is applied to the delay line 11 through a trigger driver 13 and OR gate 46. At the same time the same trigger is applied to the "ON" terminal of gate generator 18. At a later time, corresponding to the length of delay line 11 and less than the interval between radar triggers, gate generator 18 is turned "OFF" by the output of trigger separator 15. Subsequently, the next radar trigger turns generator 18 "ON." During the time that the gate generator is turned "OFF" by the output of the trigger separator 15, AND gates 19 to 22 are inhibited by the lack of output from the gate generator. When the next radar trigger turns the generator 18 "ON" the pulse interval between "OFF" and "ON" is utilized as a disabling input to AND gates 19 to 22. At this point, what has occurred is that an inhibit pulse, or actually a lack of pulse, corresponding in length to the difference between the length of delay line 11 and the interval between main trigger pulses has been used to inhibit the AND gates 19 to 22.

At the same time the separated trigger from delay line 11 is applied to delay line 26 through trigger blocking oscillator 16 and OR gate 25. This is the same trigger that turns the gate generator "OFF."

As the trigger progresses down delay line 26 it successively appears at output taps 27 through 30 and consequently at one input of AND gates 19 through 22 respectively. Since AND gates 19 through 22 are also connected to the output of gate generator 18, a particular AND gate will have an output when generator 18 is ON and simultaneously a pulse is present at its respective tap. If the pulse from gate generator 18, for example, and the trigger from delay line 26 appear at AND gate 20 simultaneously, an output from AND gate 20 is coupled to base clipper 36 which in turn is used to remove the low level bracket decode pulses present, and turns gate generator 40 on. In effect, what this means is that all AND gates 19–22 were inhibited when the trigger pulse from delay line 26 appeared at one input to AND gate 19. Subsequently the radar trigger turned gate generator "ON" so that an enabling pulse appeared at one input to AND gate 20 at the same time that the trigger pulse had progressed to the position of output tap 28 on the delay line 26.

Therefore, an output will appear at gate generator 40 which enables AND gate 32. The gate generator 40 remains on until turned off by the output of trigger separator 15. However, at this time the output of trigger 15 is previous in time to the time that gate generator 40 has been turned on so that AND gate 32 will be enabled until the next succeeding output from trigger separator 15. Thus, AND gate 32 receives bracket decode pulses which appear at output tap 28 on delay 26 and will be coincidized with the enabling pulse from gate generator 40 which consequently will produce an output at AND gate 32. The output is coupled through OR gate 43, amplifier 44 and appears as an enabling input to AND gate 45. If the next succeeding bracket decode pulse from the output of OR gate 46 occurs at the same time as the enabling input to AND gate 45, there will be an output from AND gate 45 which would correspond to a defruited output which would have occurred exactly at the proper time interval with respect to the interval between the radar system trigger pulses. At this point the output of the AND gate 45 corresponds to defruited bracket code pulses which have been synchronized to the repetition rate of the associated radar system.

Another output from gate generator 40, when the gate generator 40 is turned on, is coupled as an inhibit pulse to AND gates 21 and 22, i.e., to the succeeding AND gates, so that no further coincidizing between the output pulse from gate generator 18 and output taps 29 and 30 is done.

Upon the next succeeding trigger pulse from trigger separator 15, the gate generators 39 through 42 are turned "OFF" which readies the gate generators for the next pulse from gate generator 18 in another cycle.

What the system accomplishes is that the difference in length between delay line 11 and the difference in the interval between radar trigger pulses is measured and this measurement used to provide an additional measured delay in series with the delay line 11 which will make the total delay correspond to the interval between the associated radar system trigger pulses. Of course the amount of correction delay added is a discrete quantity and is limited by the quantity of delay line taps used in the synchronizer.

Another application for the delay line synchronizer would lie with MTI radar systems which require very accurate storage systems in order to remove static returns, i.e., recurring returns in favor of moving returns.

Obviously many modifications and variations of the present invention are possible in the light of the above teachings. It is therefore to be understood that within the scope of the appended claims the invention may be practiced otherwise than as specifically described.

What is claimed is:

1. Apparatus for selectively adding increments of delay to a fixed electrical delay line in response to the variable interval between succesive pulses of a repetitive pulse train, comprising,
   a first fixed electrical delay line having a delay time less than the minimum expected interval between successive pulses of said repetitive pulse train,
   a second delay line having a plurality of incrementally spaced taps along its delay path,
   terminal means for receiving repetitive pulses,
   coincidence gating means associated with each of said plurality of spaced taps,
   means for impressing a first of said repetitive pulses upon said fixed delay line,
   gate generator means adapted to receive said first repetitive pulse after its delay by said first delay line and responsive thereto for producing an "off" output at said gate generator,
   said gate generator means also being adapted to receive a second of said repetitive pulses and responsive thereto for producing an "on" output,
   each of said coincidence gating means being adapted to simultaneously receive the output of said gate generator means,
   each of said coincidence gating means also being adapted to receive signals from its respective tap on said second delay line and responsive to signals at said tap to gate signals from said tap when an "on" output is simultaneously received from said gate generator,
   means for impressing said first repetitive pulse upon said second delay line after its delay by said first delay line and at the same time it is received by said gate generator,
   whereby the gated incremental portion of said second delay line is substantially equal to the time difference between the delay time of said first delay line and the interval between successive ones of said repetitive pulses.

2. The apparatus of claim 1 further including means for inhibiting coincidence at successive ones of said coincidence gating means in response to coincidence at one of said gating means.

3. The apparatus of claim 2 wherein said coincidence gating means are responsive only to signals exceeding a minimum amplitude, said pulses of said repetitive train always being adjusted to exceed said minimum amplitude.

4. The apparatus of claim 3 further including means for impressing other pulse signals upon said first delay line and means for receiving said other pulses from the gated tap of said second delay line whereby said other pulse signals will be delayed by a time substantially equal to the interval between said successive pulses, said other pulses being adjusted to have amplitudes less than the minimum for which said coincidence gating means is responsive.

5. The apparatus of claim 4 wherein, said repetitive pulse train comprises repetitive trigger pulses of a radar interrogating system, said other pulses being the bracket decoded pulses of a radar IFF defruiter, and said apparatus for adding delay is adapted to synchronize a radar IFF defruiter with an associated radar transmitter.

No references cited.

CHESTER L. JUSTUS, *Primary Examiner.*

LEWIS H. MYERS, *Examiner.*

E. T. CHUNG, *Assistant Examiner.*